United States Patent
Lee et al.

(10) Patent No.: US 9,237,520 B2
(45) Date of Patent: Jan. 12, 2016

(54) METHOD FOR TRANSCEIVING CONTENTION-BASED UPLINK CHANNEL SIGNAL

(75) Inventors: Hyun Woo Lee, Anyang-si (KR); Ji Woong Jang, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 224 days.

(21) Appl. No.: 13/638,760

(22) PCT Filed: Apr. 11, 2011

(86) PCT No.: PCT/KR2011/002531
§ 371 (c)(1),
(2), (4) Date: Oct. 1, 2012

(87) PCT Pub. No.: WO2011/126351
PCT Pub. Date: Oct. 13, 2011

(65) Prior Publication Data
US 2013/0022012 A1      Jan. 24, 2013

Related U.S. Application Data

(60) Provisional application No. 61/322,303, filed on Apr. 9, 2010.

(30) Foreign Application Priority Data

Apr. 11, 2011 (KR) .................. 10-2011-0033175

(51) Int. Cl.
*H04W 72/04* (2009.01)
*H04W 52/02* (2009.01)
*H04B 7/26* (2006.01)

(52) U.S. Cl.
CPC .................. *H04W 52/0216* (2013.01)

(58) Field of Classification Search
None
See application file for complete search history.

(56) References Cited

U.S. PATENT DOCUMENTS 6,724,813 B1 *   4/2004   Jamal et al. .................. 375/219
2005/0123138 A1 *  6/2005   Abe et al. ...................... 380/255
(Continued)

FOREIGN PATENT DOCUMENTS

WO      WO 2009/022314 A2    2/2009

OTHER PUBLICATIONS

"On Contention Resolution Parameters for the IEEE 802.16 Base Station", (Sayenko, A. et al.), GLOBECOM '07, IEEE, Nov. 30, 2007.
"Blind Decoding for Carrier Aggregation", (Research in Motion UK Limited), 3GPP TSG RAN WG1 Meeting #58, Shenzhen, P. R. China, Aug. 28, 2009.

*Primary Examiner* — Ayaz Sheikh
*Assistant Examiner* — Sori Aga
(74) *Attorney, Agent, or Firm* — Dentons US LLP

(57) ABSTRACT

The present invention relates to methods for transceiving a contention-based uplink channel signal, and apparatuses for supporting the same. According to one embodiment of the present invention, a method for transmitting first uplink data through a contention-based uplink channel comprises the steps of: receiving, by a terminal, an uplink grant (CB UL Grant) message from a base station (BS), the uplink grant message including allocation information on the contention-based uplink channel; and transmitting the first uplink data, which is distinguished from second uplink data transmitted through the contention-based uplink channel by another terminal, through the contention-based uplink channel to the base station.

8 Claims, 10 Drawing Sheets

(56) References Cited

U.S. PATENT DOCUMENTS

2010/0034161 A1* 2/2010 Luo et al. .................. 370/329
2010/0034162 A1* 2/2010 Ou et al. .................. 370/329
2011/0243080 A1* 10/2011 Chen et al. ................ 370/329

* cited by examiner

METHOD FOR TRANSCEIVING CONTENTION-BASED UPLINK CHANNEL SIGNAL

This Application is a 35 U.S.C. §371 National Stage Entry of International Application No. PCT/KR2011/002531, filed Apr. 11, 2011 and claims the benefit of U.S. Provisional Application No. 61/322,303, filed Apr. 9, 2010, and Korean Application No: 10-2011-0033175, filed Apr. 11, 2011, all of which are incorporated by reference in their entirety herein.

FIELD OF THE INVENTION

The present invention relates to a communication method and apparatus for use in a wireless access system, and more particularly to methods for transceiving a contention-based uplink channel signal and apparatuses for supporting the same.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

DETAILED DESCRIPTION OF THE INVENTION

Technical Problem

If a plurality of user equipments (UEs) attempts to access a base station (BS) through a contention-based uplink channel, the UEs can transmit an uplink signal using the same identifier (ID). In this case, the UEs transmit an uplink signal using the same ID, so that the BS may have difficulty in identifying each UE.

Therefore, an object of the present invention is to provide methods for enabling a base station (BS) to effectively discriminate and demodulate uplink signals transmitted from a plurality of UEs.

Another object of the present invention is to provide methods for minimizing throughput deterioration of a base station (BS) when the BS detects and demodulates at least one uplink signal transmitted through a contention-based channel.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

Accordingly, the present invention is directed to methods for transceiving a contention-based uplink channel signal and apparatuses for supporting the same, that substantially obviate one or more problems due to limitations and disadvantages of the related art.

The object of the present invention can be achieved by providing a method for transmitting first uplink data over a contention-based uplink channel including: receiving, by a user equipment (UE), an uplink grant message including allocation information of the contention-based uplink channel from an eNode B; and transmitting the first uplink data to the eNode B over the contention-based uplink channel, wherein the first uplink data is distinguished from second uplink data transmitted over the contention-based uplink channel by another user equipment (UE).

The contention-based uplink channel may be allocated to at least one UE. The UE may not transmit a scheduling request (SR) for requesting resource allocation used to transmit the first uplink data to the eNode B, and may transmit the first uplink data to the eNode B over the contention-based uplink channel.

The method may further include selecting a reference signal (RS) parameter; selecting a scrambling code on the basis of the RS parameter; and generating the first uplink data using the scrambling code.

The method may further include: selecting a second identifier for identifying the user equipment (UE) on the basis of a first identifier contained in the uplink grant message; selecting a scrambling code depending upon the second identifier; and generating first uplink data using the scrambling code.

The method may further include: selecting a reference signal (RS) parameter; selecting an interleaving method on the basis of the RS parameter; and generating the first uplink data using the interleaving method.

In another aspect of the present invention, a method for receiving first uplink data over a contention-based uplink channel includes: transmitting, by an eNode B, an uplink grant message including allocation information of the contention-based uplink channel to a first user equipment (UE); and receiving the first uplink data from the first user equipment (UE) over the contention-based uplink channel, wherein the first uplink data is distinguished from second uplink data transmitted over the contention-based uplink channel by a second user equipment (UE).

The contention-based uplink channel may be allocated to at least one UE. The eNode B may not receive a scheduling request (SR) for requesting resource allocation used to transmit the first uplink data from the first user equipment (UE), and may receive the first uplink data from the first user equipment (UE) over the contention-based uplink channel.

The first uplink data may be generated using a scrambling code selected on the basis of a reference signal (RS) parameter.

The first uplink data may be generated using a scrambling code depending upon a second identifier capable of identifying the user equipment (UE), wherein the second identifier is selected on the basis of a first identifier contained in the uplink grant message.

The first uplink data may be generated using an interleaving method selected on the basis of a reference signal (RS) parameter.

In another aspect of the present invention, a user equipment (UE) for transmitting first uplink data over a contention-based uplink channel includes a transmission module configured to transmit a channel signal; a reception module configured to receive a channel signal; and a processor configured to support uplink data transmission over the contention-based uplink channel.

The user equipment (UE) receives an uplink grant message including allocation information of the contention-based uplink channel from an eNode B, and transmits the first uplink data to the eNode B over the contention-based uplink channel, wherein the first uplink data is distinguished from second uplink data transmitted over the contention-based uplink channel by another UE.

In another aspect of the present invention, an eNode B (eNB) for receiving first uplink data over a contention-based uplink channel includes a transmission module configured to transmit a channel signal; a reception module configured to receive a channel signal; and a processor configured to support uplink data reception over the contention-based uplink channel.

The eNode B (eNB) enables the transmission module to transmit an uplink grant message including allocation information of the contention-based uplink channel to a first user equipment (UE), and enables the reception module to receive the first uplink data from the first user equipment (UE) over the contention-based uplink channel, wherein the first uplink data is distinguished from second uplink data transmitted over the contention-based uplink channel by a second user equipment (UE).

The aforementioned technical solutions are only a part of the embodiments of the present invention, and various modifications to which technical features of the present invention are applied could be understood by the person with ordinary skill in the art to which the present invention pertains, based on the following detailed description of the present invention.

Effects of the Invention

As is apparent from the above description, exemplary embodiments of the present invention have the following effects.

First, a base station (BS) can effectively discriminate and demodulate an uplink signal transmitted from a plurality of UEs.

Second, if the BS detects and demodulates at least one uplink channel signal transmitted through a contention-based channel, throughput deterioration of the BS can be minimized.

Third, the number of detection and demodulation attempt times of a BS for use in a contention-based uplink channel is minimized, so that complexity of a BS processing operation can be reduced and the amount of power used by the BS can also be reduced.

Fourth, a response to contention-based channel signal transmission for transmission of a plurality of UEs is discriminated per UE by a BS, so that the BS can transmit the resultant response.

Fifth, each UE receives and demodulates only a response associated with its own transmission channel signal from among responses of the received contention-based uplink channel signal, so that complexity of the processing operation can be reduced and the amount of power used by the UE can also be reduced.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

BEST MODE FOR CARRYING OUT THE INVENTION

Figure 1:
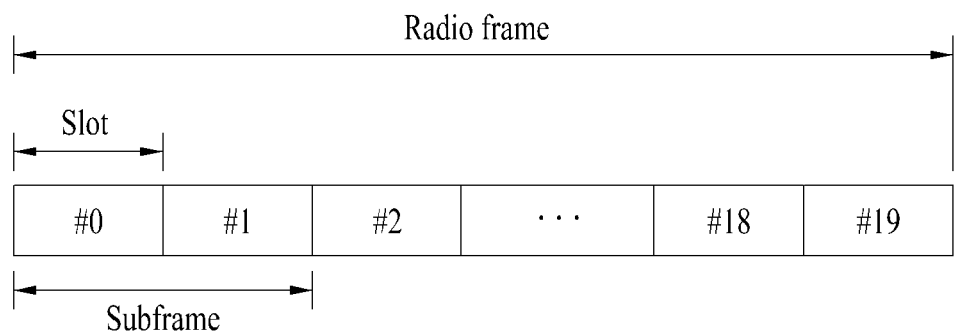
FIG. 1 exemplarily shows a radio frame structure applicable to the embodiments of the present invention.

Various methods for transmitting/receiving a contention-based uplink channel signal and apparatuses for supporting the same according to embodiments of the present invention will hereinafter be described in detail.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may confuse the substance of the present invention, are not explained. Additionally, procedures or steps, which can be understood by those skilled in the art, are not explained as well.

In exemplary embodiments of the present invention, a description is made of a data transmission and reception relationship between a base station (BS) and a Mobile Station (MS). Herein, the term 'BS' refers to a terminal node of a network, which communicates directly with the MS. In some cases, a specific operation described as being performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point (AP)', etc. The term 'MS' may be replaced with the term 'User Equipment (UE)', 'Subscriber Station (SS)', 'Mobile Subscriber Station (MSS)', 'mobile terminal', 'terminal', etc.

The term "terminal" may also be replaced with the term user equipment (UE), mobile station (MS), subscriber station (SS), mobile subscriber station (MSS), mobile terminal or advanced mobile station (AMS) as necessary.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station (BS) becomes a transmitter.

The embodiments of the present invention are supported by standard documents disclosed in at least one of the Institute of Electrical and Electronic Engineers (IEEE) 802.xx system, the $3^{rd}$ generation partnership project (3GPP) system, the 3GPP LTE system and the 3GPP2 system, all of which are wireless access systems. In particular, the embodiments of the present invention are supported by the standard documents such as the 3GPP TS 36.211, TS 36.212, TS 36.213 and/or 3GPP TS 36.321, all of which are the standard documents of the 3GPP LTE system. That is, the steps or the portions of the embodiments of the present invention which are not described in order to clarify the technical spirit are supported by the above-described documents. All the terms disclosed in the present specification may be described by the above-described standard documents.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like.

CDMA may be embodied with radio technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with radio technology such as Institute of Electrical and Electronics Engineers (IEEE) 802.11 (Wi-Fi), IEEE 802.16 (WiMax), IEEE 802-20, and E-UTRA (Evolved UTRA).

The UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. For clarity, the following description focuses on 3GPP LTE and LTE-A. However, the present invention is applicable to an IEEE 802.16e/m system.

1. Basic Structure of 3GPP LTE/LTE_A System

FIG. 1 exemplarily shows a radio frame structure applicable to the embodiments of the present invention.

Referring to FIG. 1, a radio frame includes 10 subframes, and one subframe includes two slots. A time required for transmission of one subframe is called a Transmission Time Interval (TTI). For example, the length of one subframe may be set to 1 ms, and the length of one slot may be set to 0.5 ms.

One slot includes a plurality of Orthogonal Frequency Division Multiplexing (OFDM) symbols in a time domain, and includes a plurality of Resource Blocks (RBs) in a frequency domain. The OFDM symbol may be adapted to represent one symbol period because 3GPP LTE uses OFDMA technology on downlink, and may be referred to as an SC-FDMA symbol or a symbol period according to a multiple access scheme. One RB includes a plurality of successive subcarriers in one slot on a RB basis.

The radio frame structure shown in FIG. 1 is disclosed for illustrative purposes only, and the number of subframes contained in a radio frame, the number of slots contained in a subframe, and the number of FDM symbols contained in the slot may be changed in various ways.

Figure 2:
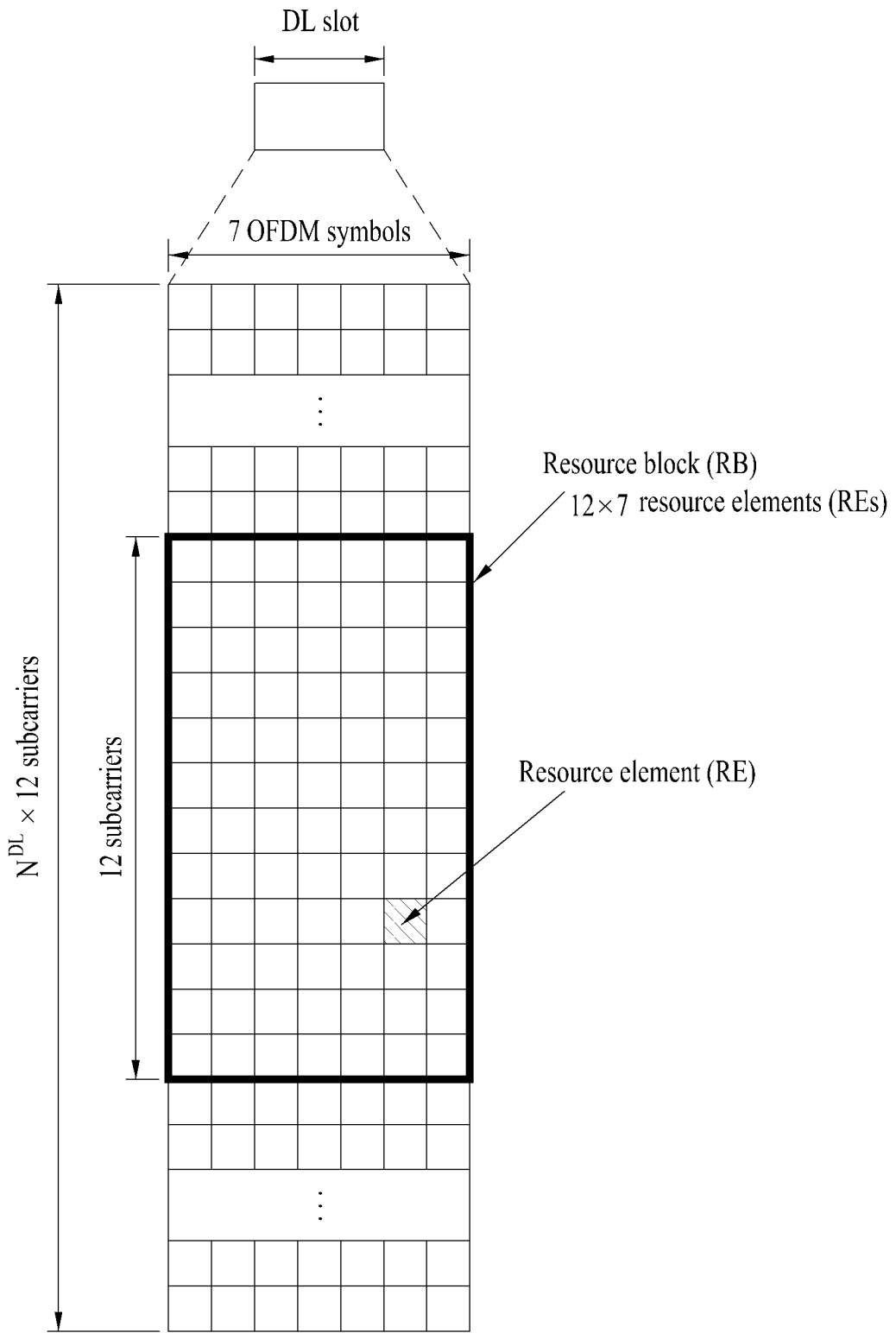
FIG. 2 exemplarily shows a resource grid of one downlink slot applicable to the embodiments of the present invention.

FIG. 2 exemplarily shows a resource grid of one downlink slot applicable to the embodiments of the present invention.

One downlink slot includes a plurality of OFDM symbols in a time domain. Referring to FIG. 2, one downlink slot exemplarily includes 7 OFDM symbols, and one resource block (RB) exemplarily includes 12 subcarriers in a frequency domain.

Each element on the resource grid is referred to as a resource element (RE). One RB includes 12×7 resource elements (REs). The number $N^{DL}$ of RBs included in the downlink slot is determined based on a downlink transmission bandwidth.

Figure 3:
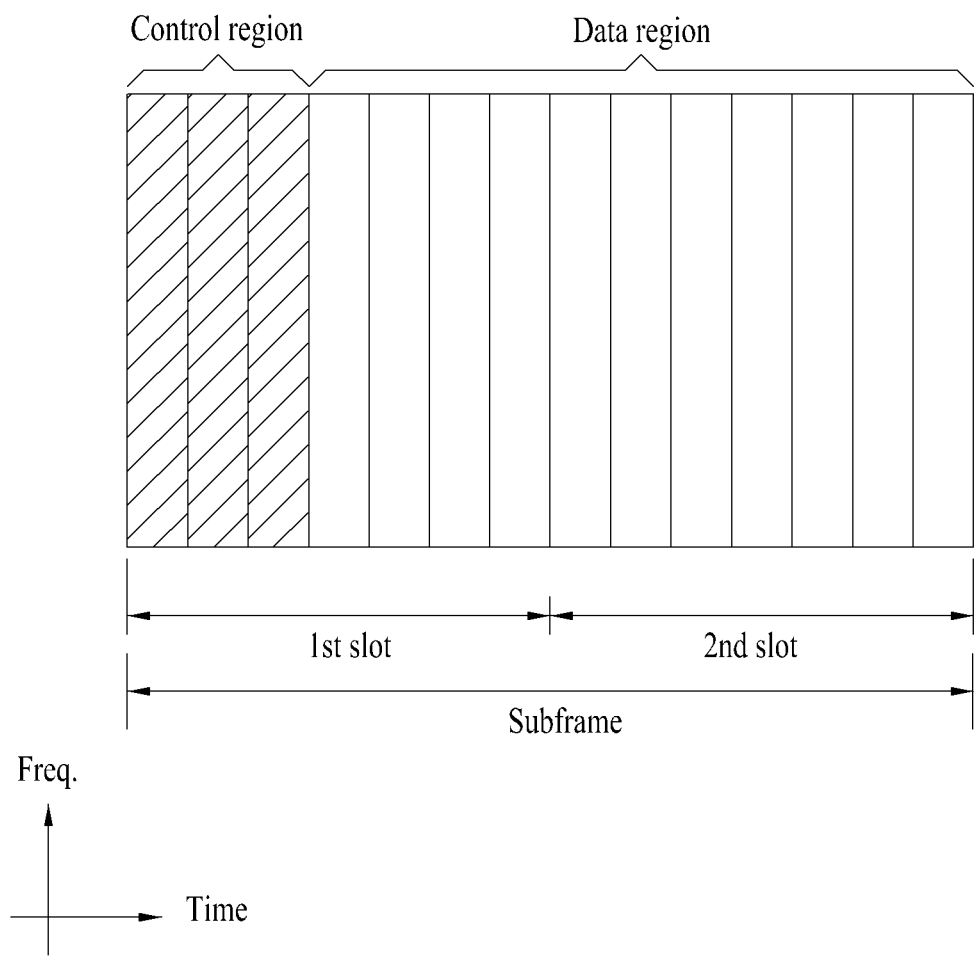
FIG. 3 exemplarily shows a downlink frame structure applicable to the embodiments of the present invention.

FIG. 3 exemplarily shows a downlink frame structure applicable to the embodiments of the present invention.

Referring to FIG. 3, one downlink subframe includes two slots in a time domain. A maximum of three OFDM symbols located in the front of the downlink subframe are used as a control region to which control channels are allocated, and the remaining OFDM symbols are used as a data region to which a Physical Downlink Shared Channel (PDSCH) channel is allocated.

DL control channels for use in the 3GPP LTE system include a Physical Control Format Indicator CHannel (PCFICH), a Physical Downlink Control Channel (PDCCH), a Physical Hybrid-ARQ Indicator CHannel (PHICH), and the like. The traffic channel includes a Physical Downlink Shared CHannel (PDSCH). PCFICH transmitted through a first OFDM symbol of the subframe may carry information about the number of OFDM symbols (i.e., size of the control region) used for transmission of control channels within the subframe. PHICH may carry ACK (Acknowledgement)/NACK (Non-Acknowledgement) signals about a UL Hybrid Automatic Repeat Request (UL HARQ). That is, the ACK/NACK signals about UL data transmitted from the UE are transmitted over PHICH.

Control information transmitted over a PDCCH is referred to as Downlink Control Information (DCI). DCI includes resource allocation information for either a UE or a UE group and other control information. For example, DCI includes uplink/downlink (UL/DL) scheduling information, an uplink transmission (UL Tx) power control command, etc.

PDCCH carries a variety of information, for example, transmission format and resource allocation information of a downlink shared channel (DL-SCH), transmission format and resource allocation information of an uplink shared channel (UL-SCH), paging information transmitted over a paging channel (PCH), system information transmitted over the DL-SCH, resource allocation information of an upper-layer control message such as a random access response transmitted over PDSCH, an aggregate of Tx power control commands of each UE contained in a UE group, a Tx power control command, activation indication information of Voice over IP (VoIP), and the like.

A plurality of PDCCHs may be transmitted within a control region. A user equipment (UE) can monitor a plurality of PDCCHs. PDCCH is transmitted as an aggregate of one or more contiguous control channel elements (CCEs). CCE is a logical allocation unit that is used to provide a coding rate based on a radio channel state to a PDCCH. CCE may correspond to a plurality of resource element groups (REGs). The format of PDCCH and the number of PDCCH bits may be determined according to the number of CCEs. A base station (BS) decides a PDCCH format according to DCI to be sent to the UE, and attaches a Cyclic Redundancy Check (CRC) to control information.

The CRC is masked with an identifier (e.g., a Radio Network Temporary Identifier (RNTI)) according to a PDCCH owner or a purpose of the PDCCH. For example, provided that the PDCCH is provided for a specific UE, a unique identifier (e.g., cell-RNTI (C-RNTI)) of the UE may be masked with the CRC. If a PDCCH is provided for a paging message, a paging identifier (e.g., paging-RNTI (P-RNTI)) may be masked with a CRC. If a PDCCH is provided for system information (e.g., system information block (SIC)), a system information identifier and system information RNTI (S-RNTI) may be masked with CRC. In order to indicate a random access response acting as a response of UE random access preamble reception, the CRC may be masked with the random access RNTI (RA-RNTI).

In a carrier aggregation (CA) environment, a PDCCH may be transmitted through one or more CCs and include resource allocation information for one or more CCs. For example, although the PDCCH is transmitted through one CC, the PDCCH may include resource allocation information for one or more PDSCHs and PUSCHs.

Figure 4:
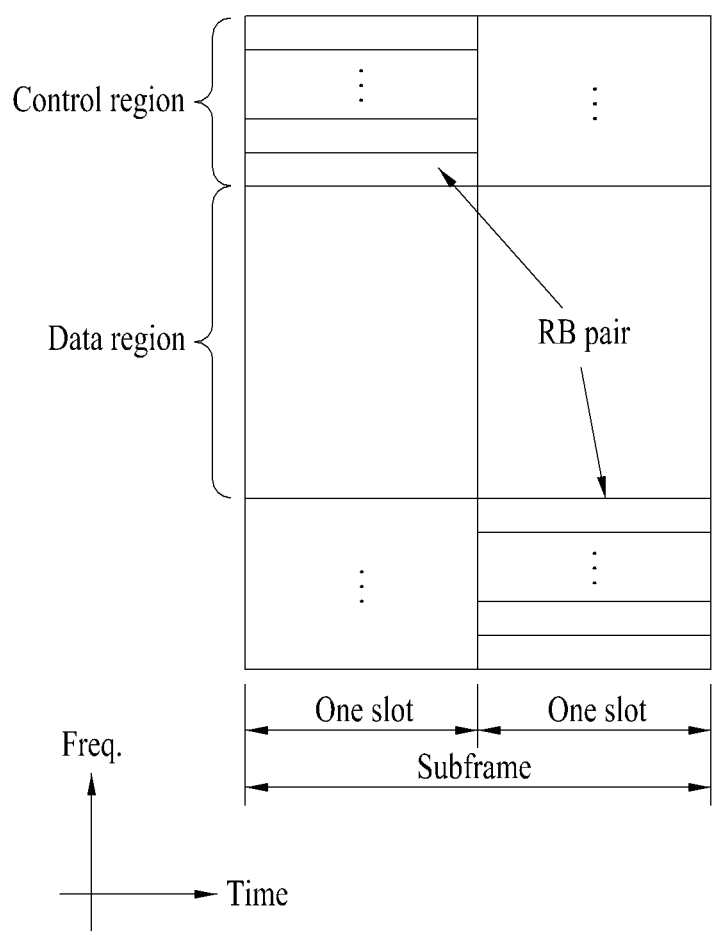
FIG. 4 exemplarily shows an uplink subframe structure applicable to the embodiments of the present invention.

FIG. 4 is a diagram illustrating a UL subframe structure which can be used in embodiments of the present invention.

Referring to FIG. 4, a UL subframe includes a plurality of slots (e.g. two slots). Each slot may include a different number of SC-FDMA symbols according to the length of a Cyclic Prefix (CP). The UL subframe is divided into a data region and a control region in the frequency domain. The data region includes a Physical Uplink Shared Channel (PUSCH) and is used to transmit data signals including voice information. The control region includes a PUCCH and is used to transmit Uplink Control Information (DCI). The PUCCH includes an RB pair located at both ends of the data region in the frequency domain and is hopped using the slot as a boundary. In an LTE system, a UE does not simultaneously transmit a PUCCH signal and PUSCH signal in order to maintain a single carrier property. However, the LTE-A system can simultaneously transmit a PUCCH signal and a PUSCH signal in the same subframe according to a UE transmission mode, and the PUCCH signal can be piggybacked on the PUSCH signal.

A PUCCH for one UE is allocated in an RB pair in a subframe and RBs belonging to the RB pair occupy different subcarriers in each of two slots. Thus, the RB pair allocated to the PUCCH is 'frequency-hopped' at a slot boundary.

The PUCCH may be used to transmit the following control information.

Scheduling Request (SR): SR is used for requesting UL-SCH resources and is transmitted using an On-Off Keying (00K) scheme.

HARQ ACK/NACK: HARQ ACK/NACK is a response signal to a DL data packet on a PDSCH. HARQ ACK/NACK indicates whether or not a DL data packet has been successfully received. 1-bit ACK/NACK is transmitted as a response to a single DL codeword, and 2-bit ACK/NACK is transmitted as a response to two DL codewords.

Channel Quality Indicator (CQI): CQI is feedback information for a DL channel. Multiple Input Multiple Output (MIMO)-associated feedback information includes a Rank Indicator (RI) and a Precoding Matrix Indicator (PMI). 20 bits are used per subframe.

The amount of UCI that can be transmitted in a subframe by a UE is dependent upon the number of SC-FDMA symbols available for UCI transmission. The SC-FDMA symbols available for UCI transmission indicate the remaining SC-FDMA symbols other than SC-FDMA symbols that are used for reference signal transmission in a subframe. In the case of a subframe in which a Sounding Reference Signal (SRS) is configured, the last SC-FDMA symbol of the subframe is also excluded. The reference signal is used for coherent detection of a PUCCH. The PUCCH supports 7 formats according to transmission information.

Table 1 shows the mapping relationship between PUCCH format and UCI for use in LTE.

TABLE 1

| PUCCH format | Uplink control information (UCI) |
| --- | --- |
| Format 1 | Scheduling request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK for extended CP only |
| Format 2a | CQI and 1-bit HARQ ACK/NACK |
| Format 2b | CQI and 2-bit HARQ ACK/NACK |

Referring to Table 1, UCI according to a PUCCH format can be confirmed.

A variety of wireless access technologies of the 3GPP system can be applied to embodiments of the present invention. For example, a detailed description of a UL channel and a reference signal (RS) for use in the embodiments of the present invention may be given with reference to parts below Section 5.1 of the 3GPP TS 36.211 standard documents and parts below Section 5.2 of the 3GPP TS 36.212 standard documents.

2. Shard D-SR (Shared Dedicated—Scheduling Request)

The following two options

Option 1: UL grant can be addressed to a new SR-RNTI. That is, a new SR-RNTI may be configured per group of shared UEs.

Option 2: PUCCH format 1a or PUCCH format 1b may be used for SR. For example, when PUCCH format 1a is used, two UEs can be identified. In addition, when PUCCH format 1b is used, four UEs can be identified. After an eNode B (eNB) receives the SR using PUCCH format 1a or PUCCH format 1b, the eNB can transmit a regular UL grant to the identified UE.

A shared PUCCH SR transmission process using Option 1 will hereinafter be described in detail.

When at least two UEs share the same SR resource, the eNB is unable to recognize whether or not at least one UE shares one SR. In this case, (1) the eNB may allocate a shared UL grant to a UE; and (2) the eNB can allocate a dedicated grant to each UE whenever receiving a shared SR.

Figure 5:
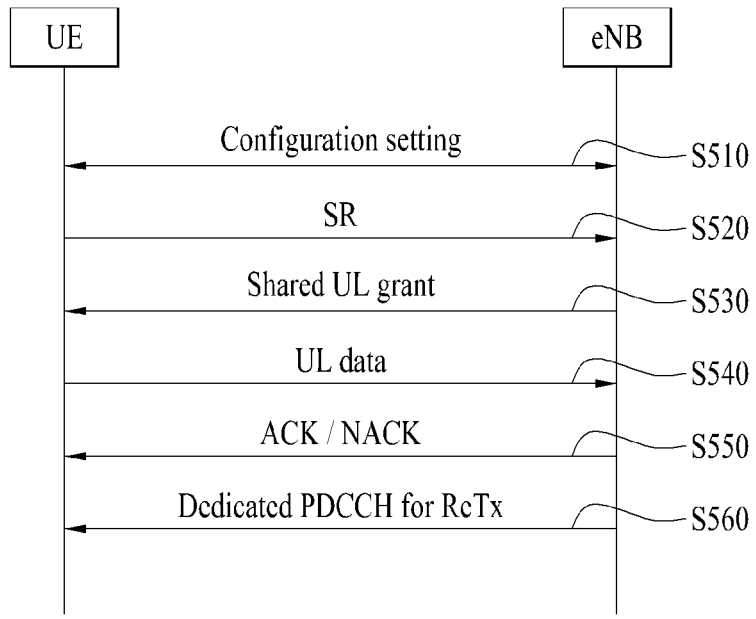
FIG. 5 exemplarily shows a method for enabling a base station (BS) to allocate a shared uplink (UL) grant to a user equipment (UE).

FIG. 5 exemplarily shows a method for enabling a base station (BS) to allocate a shared uplink (UL) grant to a user equipment (UE).

After the eNB allocates a shared UL grant to the UE, if it is difficult for the eNB to perform HARQ transmission, the eNB can allocate a dedicated grant to all UEs sharing the corresponding SR.

Referring to FIG. 5, the eNB informs at least one UE of radio resource information (e.g., offset information, period information, etc.) required for transmitting a shared scheduling request (SR) to at least one UE, so that connection between the eNB and the UE can be configured. In this case, the shared scheduling request resource is a PUCCH resource used for the UE capable of transmitting a scheduling request to the eNB, and can be repeatedly allocated to two or more UEs. The above-mentioned resource can be classified into a physical time/frequency region and a sequence (or code) in step S510.

In step S520, the UE can transmit the shared scheduling request (SR) signal to the eNB so as to request uplink resource allocation based on the radio resource information received in step S510.

The eNB having received the SR can allocate a shared uplink resource to the UE, and can transmit a PDCCH signal including a shared UL grant to the UE so as to indicate the allocated shared uplink resource in step S530.

The UE transmits UL data to the eNB through the allocated shared UL resource (i.e., PUSCH).

Since at least two UEs simultaneously transmit UL data through the shared UL resource, collision between UL data parts may occur. In addition, errors may occur in UL data transmitted from the UE, or UL data may not be transmitted through UL resources that have been allocated to the UE by the eNB. In this case, the eNB transmits a negative-acknowledgement (NACK) to the UE in step S550.

The eNB can allocate a dedicated UL resource to each UE so as to allocate a new uplink resource. For example, the eNB can allocate a dedicated UL grant to each UE sharing the SR. Alternatively, a dedicated UL grant may be allocated to some parts of UEs sharing the SR, and non-adaptive HARQ retransmission can be performed on the shared PUSCH resources of the remaining UEs in step S560.

Referring to FIG. 5, since the dedicated UL grant is allocated to each UE which has failed in UL transmission, collision between UL data parts can be prevented, and retransmission delay can also be controlled.

Differently from FIG. 5, the eNB can allocate a dedicated grant to each UE whenever receiving the shared SR. Although a plurality of UEs shares the SR through the dedicated signaling configuration, the eNB can allocate a dedicated UL grant for each UE.

As a result, collision in uplink data between UEs can be prevented from occurring in PUSCH transmission, and a retransmission method for use in the LTE Rel-8 system can be used without change. All UEs having received the UL grant do not include data to be transmitted, so that some parts of the PUSCH signal may be discarded. If a dedicated UL grant is allocated to each UE whenever the eNB receives the SR, the amount of consumed PUSCH resources may be smaller than the amount of CB-PUSCH resources.

Figure 6:
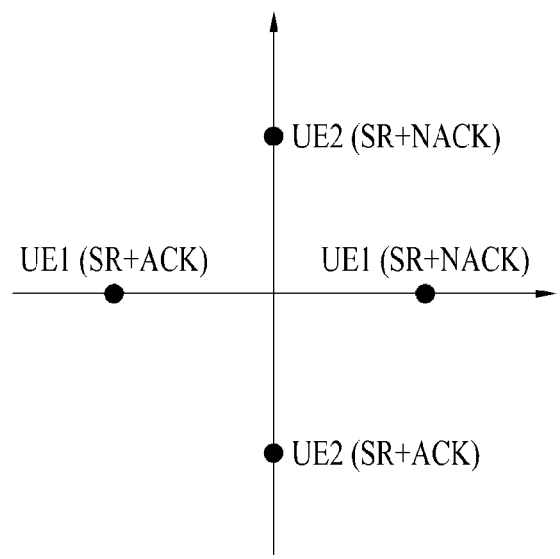
FIG. 6 is a conceptual diagram illustrating a method for employing PUCCH formats 1a and 1b for a shared PUCCH-SR.

FIG. 6 is a conceptual diagram illustrating a method for employing PUCCH formats 1a and 1b for a shared PUCCH-SR.

A method for employing PUCCH format 1a or PUCCH format 1b for a shared PUCCH SR will hereinafter be described with reference to Option 2. Referring to FIG. 6, each UE uses PUCCH format 1a or 1b, so that it can share the same SR without collision. In other words, although two UEs transmit the SR in the same TTI, the eNB can successfully detect the SR and can identify each UE.

Hereinafter, an exemplary case in which a method for transmitting a contention-based PUSCH signal and a D-SR method are simultaneously used will be given below.

A contention-based uplink channel is allocated because the eNB cannot predict a specific time at which a scheduling request (SR) or a bandwidth request (BR) of each UE is needed. In addition, there is a need for the UE to quickly communicate with the eNB in an emergency situation or a high-speed movement environment. In this case, assuming that an arbitrary UE establishes connection to the eNB through several signaling times, this assumption may be far from efficient. Therefore, a contention-based uplink channel is used when an arbitrary UE needs to quickly communicate with the eNB.

Assuming that contention-based resource allocation is available to all TTIs, a difference of 3 ms or 1 ms may occur between the CB transmission period and the SR period, because the UE need not transmit a D-SR to the eNB and need not wait for a response to the D-SR. Although the same effect as described above can be achieved through a predetermined dedicated UL resource, allocating dedicated resources to all UEs in all TTIs requires high costs.

Figure 7:
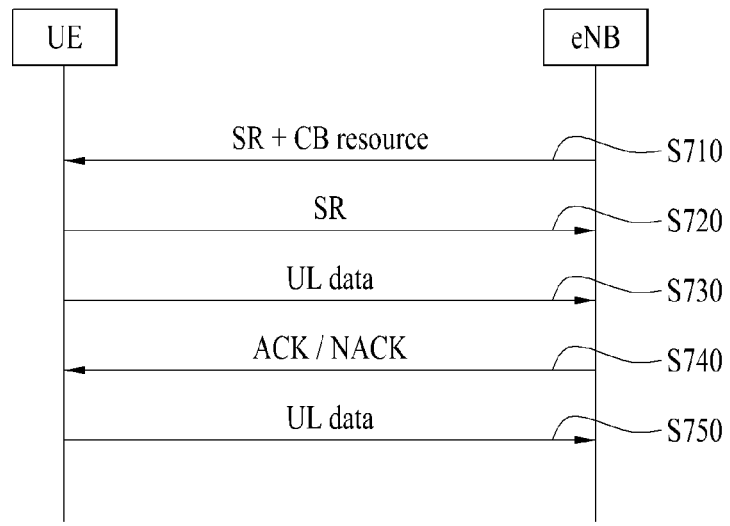
FIG. 7 is a conceptual diagram illustrating an example of a scheduling request procedure related to contention-based data transmission.

FIG. 7 is a conceptual diagram illustrating an example of a scheduling request procedure related to contention-based data transmission.

Referring to FIG. 7, the eNB can transmit resource information (i.e., SR resource information) needed for a shared dedicated scheduling request (D-SR) and resource information (i.e., CB resource information) needed for a contention-based uplink channel to one or more UEs in step S710.

In step S710, SR resource information is PUCCH resource information required when the UE transmits a scheduling request (SR) to the eNB, and CB resource information is PUSCH resource information for contention-based UL data transmission. The SR resource information and the CB resource information can be repeatedly allocated to two or more UEs. In addition, the SR resource information and the CB resource information can be distinguished from each other according to a physical time/frequency region and a sequence or code.

Although the step S710 can be allocated through upper layer signaling such as Radio Resource Control (RRC), dynamic UL resource allocation can be replaced with allocation using a PDCCH signal including a CB-RNTI as necessary.

If UL data to be transmitted by one or more UEs exists, the UEs can transmit the scheduling request (SR) to the eNB so as to receive UL resources to be used for UL data transmission in step S720.

In addition, the UE can transmit UL data (i.e., a transport block TB) along with the SR to the eNB without waiting for a UL grant based on SR transmission in step S730.

The eNB can identify the UE using a CB resource on the basis of the received SR. If the eNB receives one or more SRs associated with the same UL resource, the eNB can determine collision between UEs. Therefore, the eNB can transmit a NACK signal and a dedicated UL grant to the UE, irrespective of normal or abnormal reception of UL data. If the eNB receives only one SR associated with the same UL resource, the eNb can determine the absence of collision between UEs. Therefore, if the eNB has normally received UL data transmitted through the corresponding UL resource, the eNB can transmit an ACK signal to the UE in step S740. Otherwise, the eNB can transmit a NACK signal to the UE in step S740.

If the UE receives the NACK signal from the eNB, the UE can retransmit the corresponding UL data. If the UE receives the ACK signal from the eNB, the UE can transmit new UL data in step S750.

Since the UE was identified through SR in step S750, the UE can adaptively retransmit UL data to the eNB through other UL resources. As a result, the UE can reduce load of CB resources.

3. Method for Transmitting Contention-Based Uplink Channel Signal

In accordance with a method for transmitting an uplink signal through a contention-based (CB) uplink channel (e.g., CB-PUSCH, CB-PUCCH, etc.), UEs having performed uplink synchronization can transmit a UL channel signal to the eNB without receiving uplink resources using a general method. That is, in accordance with a method for transmitting a CB UL channel signal, the UE transmits the scheduling request (SR) to the eNB, and transmits an uplink channel signal without receiving an SR-based uplink resource. The above-mentioned method for transmitting the CB UL channel signal can reduce transmission delay and signaling overhead. The UL signal transmission method through a CB UL channel will hereinafter be referred to as "CB transmission" or "UL transmission". In addition, the channel signal conceptually includes a UL data signal and a UL control signal.

In accordance with general characteristics of CB transmission, the error rate of multiple users employing the same shared UL grant is increased. Therefore, it is very important for the eNB to perform a rapid/efficient resource allocation method and means between CB transmission and CF (Contention Free) transmission.

Although uplink resources for CB transmission can be allocated through higher layer signaling such as RRC, a rapid and dynamic allocation method of uplink resource blocks for CB transmission is designed to use a downlink physical control channel (PDCCH). The CB grant transmitted on PDCCH may be adapted to allocate uplink resources for CB transmission. In order to identify the CB grant transmitted through a PDCCH, a PDCCH signal and a Contention Based Radio Network Temporary Identifier (CB-RNTI) can be used. The CB grant can be scheduled per subframe in the same manner as in other grants. In this way, UL CF transmission scheduling may not be affected by CB transmission, and static or semi-static allocation of CB resources can be prevented even when the CB resources are dynamically allocated according to UL load.

For UL transmission of the UE, the CB grant can indicate transmission resources on a PUSCH. Therefore, CB uplink data can be transmitted on a PUSCH. The UE can transmit CB-UL data through a UL resource (i.e., a CB UL channel resource) indicated by the CB grant only when the UE does not include a dedicated CF grant at a specific time.

If a common resource is used, a C-RNTI MAC control element can be added to a MAC PDU so as to identify the UE, and a Buffer Status Report (BSR) can be used to help an uplink scheduler of the eNB. Simultaneously with CB transmission, the UE can transmit the scheduling request (SR) for requesting CF resources to the eNB.

That is, UL data is transmitted on a PUSCH, a C-RNTI MAC control element is added to identify each UE, and the UE can simultaneously transmit not only initial UL transmission information but also the BSR so as to help an uplink scheduler.

4. Contention-Based Uplink Signal Transmission Method Using Scrambling Code

If the UE transmits contention-based UL data through a PUSCH or a PUCCH, at least one UE can perform UL transmission through a contention-based physical resource. In this case, UL signals transmitted from one or more UEs can deteriorate eNB detection throughput.

In order to discriminate each signal, the UE and/or the eNB for use in the wireless access system is configured to use the scrambling technique. For example, for uplink transmission, each UE for use in the LTE system performs scrambling using values associated with RNTI (Radio Network Temporary Identifier, $n_{RNTI}$) at a previous stage of the modulation stage. In this case, $n_{RNTI}$ acting as a Cell-RNTI (C-RNTI) is a unique value for identifying each UE, and the UE performs scrambling using the same C-RNTI value in case of PDCCH decoding and PUSCH transmission. That is, the RNTI used when a specific UE decodes downlink information can also be applied to UL transmission of the corresponding UE.

If the eNB transmits one UL grant (or resource allocation information) to a plurality of UEs, the eNB can utilize an RNTI capable of being accessed by a plurality of UEs. The eNB may use only one RNTI even when RNTI is used to allocate a specific channel. The UE having received the UL grant can transmit contention-based UL data to the eNB using the RNTI.

In this case, if multiple UEs attempt to connect to the eNB through the contention-based uplink channel (for example, CB-PUSCH or CB-PUCCH), the UEs can perform UL transmission using the same RNTI. Therefore, if a plurality of UEs attempts to connect to the eNB through the same uplink radio resource, the eNB may have difficulty in identifying each UE because the UEs transmit UL data using the same RNTI.

That is, since the plurality of UEs generates and transmits a plurality of UL signals through the same scrambling, decoding throughput of the eNB can be greatly deteriorated. Therefore, a method for enabling the eNB to effectively identify and demodulate UL signals transmitted from the plurality of UEs is needed.

Therefore, when the eNB detects and demodulates signals transmitted from one or more UEs through the contention-based UL channel (e.g., CB-PUSCH or CB-PUCCH), the present invention provides methods for minimizing performance deterioration of the eNB and methods for minimizing the number of demodulation attempt times by the eNB.

As exemplary methods for utilizing different scrambling codes, a method for utilizing the scrambling code associated with a reference signal (RS) and a method for utilizing the RNTI-associated scrambling code will hereinafter be described in detail.

In order to efficiently identify and demodulate signals transmitted from a plurality of UEs by the eNB, the UE can transmit UL data using different scrambling codes within the contention-based UL channel. If there are a large number of available sets of the scrambling code, all available scrambling code sets must be detected and demodulated by the eNB. In this case, when the eNB detects and demodulates the scrambling code, complexity may be increased and eNB power may be wasted.

Therefore, when using different scrambling codes, the present invention provides methods for efficiently performing detection and demodulation of the eNB by limiting or combining the scrambling code set with other parameters which are used to indicate a cyclic prefix (CP) of a reference signal (RS) or an interleaving order or method.

In the case of different scrambling codes for use in the embodiments of the present invention, a specific system may utilize the legacy scrambling code. For example, the above-mentioned scrambling code may indicate a scrambling code, etc. for use in a previous stage of the modulation stage in the 3GPP LTE system. In addition, an additional scrambling code may be used differently from the legacy scrambling.

(1) Method for Using RS-Associated Scrambling Code

Figure 8:
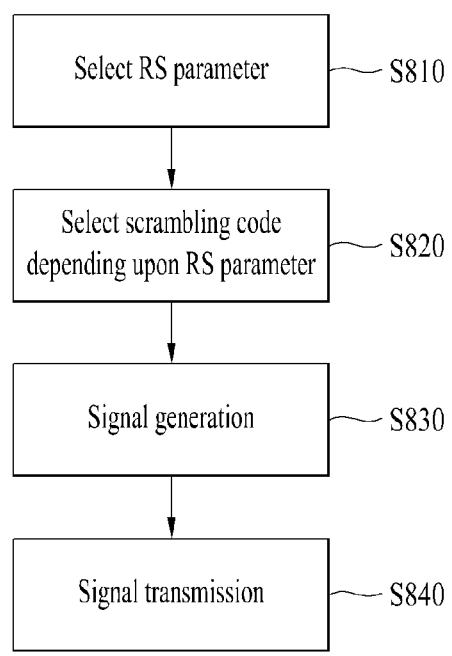
FIG. 8 is a flowchart illustrating a method for transmitting uplink data using a scrambling code related to a reference signal according to an embodiment of the present invention.

FIG. 8 is a flowchart illustrating a method for transmitting uplink data using a scrambling code related to a reference signal (RS) according to an embodiment of the present invention.

In order to enable the eNB to effectively identify and demodulate signals transmitted from a plurality of UEs, the UEs can utilize different scrambling codes associated with the RS. The UE can arbitrarily select the RS parameter before selecting the scrambling code in step S810.

The UE can select the scrambling code based on the selected RS parameter. That is, the UE can obtain the scrambling code to be used by the UE from among the selected RS parameters in step S820.

In addition, the UE can generate an uplink signal using the selected RS parameter and the scrambling code in step S830, and can transmit the generated uplink signal to the eNB in step S840.

In step S810, the UE can utilize the scrambling codes associated with an RS code index, an RS cyclic shift amount, and/or a cyclic prefix (CP) index. The RS cyclic prefix may be carried out in a time domain and/or a frequency domain. In addition, the UE can arbitrarily select the RS parameter from a specific RS set as a good opportunity. Alternatively, an RS parameter can be selected on the basis of a UE ID such as C-RNTI.

Figure 9:
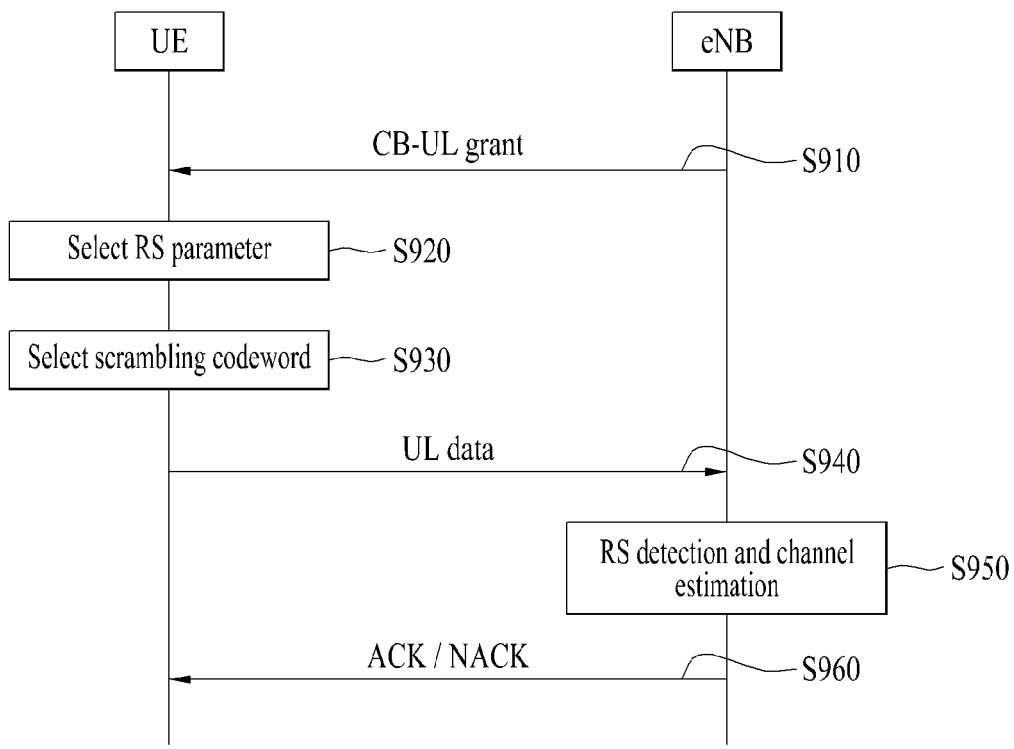
FIG. 9 is a flowchart illustrating another method for transmitting uplink data using a scrambling code related to a reference signal according to an embodiment of the present invention.

FIG. 9 is a flowchart illustrating another method for transmitting uplink data using a scrambling code related to a reference signal (RS) according to an embodiment of the present invention.

Referring to FIG. 9, the eNB can transmit a CB-UL grant so as to allocate a contention-based resource to the UE. In this case, the UE receives and decodes the CB-UL grant so that it can obtain resource information of the contention-based UL channels (e.g., CB-PUCCH, CB-PDSCH, and the like) in step S910.

The UE can select an RS parameter to be used from among the set of RS parameters according to a predetermined rule. The RS parameter may be set to a cyclic prefix (CP) amount and/or CP index to be applied to a specific code index. Alternatively, the RS parameter may be set to a code index and a CP amount and/or CP index to be applied to the code index. For example, a UE equipped with one Tx antenna is configured to use the same physical root index using a CP of the RS code having a length of 12 in one resource block (RB), and at the same time a maximum of 12 codes can be utilized in step S920.

The UE can select a code to be used for scrambling from among the selected RS parameters according to a predetermined rule in step S930.

The UE can generate UL data using the selected RS parameter and the scrambling code, and transmit the generated UL data to the eNB. That is, the UE can transmit UL data to the eNB using resource allocation information (for example, CB-PUSCH) obtained through the CB-UL grant in step S940.

The eNB can perform RS detection and channel estimation for the sets of available RS parameters. For example, if an RS corresponding to a specific RS parameter is detected, the eNB can recognize the scrambling code associated with the corresponding RS. That is, the eNB can demodulate UL data using the RS parameter and the scrambling code in step S950.

The eNB can scramble a response (e.g., ACK/NACK) to the detected scrambling codes using each scrambling code or associated scrambling codes, and can transmit the scrambled result to the UE. Preferably, a scrambling code used when the UE transmits UL data and a scrambling code used for a response of the eNB may be selected according to a predetermined rule in step S960.

If several UEs transmit UL data using different scrambling codes, the scrambling code transmitted from each UE or only the ACK/NACK (i.e., a response message) corresponding to associated scrambling codes are received and demodulated by each UE, so that the UE can receive a response to the UL data.

In FIG. 9, a transmission/reception process of the CB-UL grant in step S910 may be replaced with a transmission/reception process of shared D-SR information. In addition, although CB-PUSCH has been disclosed in FIG. 9 as an example, the scope or spirit of the CB-PUSCH is not limited thereto, and the RS parameter and the scrambling code can also be applied to CB-PUCCH without difficulty.

As a modification of FIG. 9, if the UE simultaneously transmits a shared D-SR signal and a CB-PUSCH signal (or if the UE sequentially transmits the shared D-SR signal and the CB-PUSCH signal without waiting for a specific response from the eNB), the UE modifies the RS-associated scrambling code into the scrambling code associated with the shared D-SR, and uses the modified result. That is, when the UE transmits a specific shared D-SR to the eNB, the UE can select the scrambling code associated with the shared D-SR according to a predetermined rule.

In accordance with the embodiments of the present invention, the UE includes UE-specific information (for example, C-RNTI, station ID, etc.) in the contention-based UL channel signal in such a manner that the eNB can quickly and correctly determine which UE is associated with the UL channel signal, and then transmit the resultant contention-based UL channel signal to the eNB.

(2) Method for Using RNTI-Associated Scrambling Code

Figure 10:
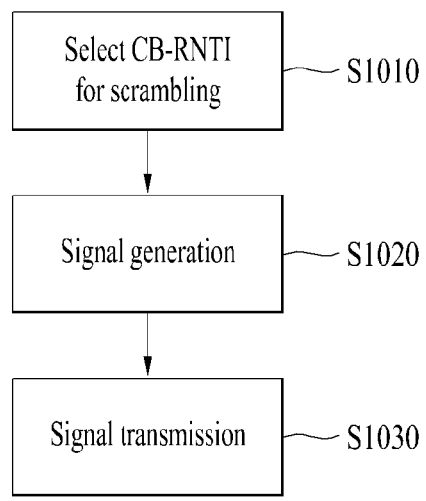
FIG. 10 is a flowchart illustrating a method for transmitting uplink data using a scrambling code related to an identifier according to an embodiment of the present invention.

FIG. 10 is a flowchart illustrating a method for transmitting uplink data using a scrambling code related to an identifier according to an embodiment of the present invention.

In order to enable the eNB to effectively identify and demodulate signals transmitted from a plurality of UEs, the UEs can transmit UL data using different RNTIs in the contention-based channel. Although the embodiments of the present invention have exemplarily disclosed an RNTI as an identifier, the RNTI can be replaced with another ID for scrambling as necessary without departing from the scope or spirit of the present invention. For example, in accordance with the IEEE 802.16m system, the RNTI may be replaced with a station ID (STID) as necessary.

In order to transmit UL data through the contention-based UL channel according to the embodiments of the present invention, a new CB-RNTI (Contention Based-RNTI) is defined. Of course, the UE may use the legacy C-RNTI without change.

Referring to FIG. 10, the UE can select a CB-RNTI for scrambling in step S1010.

The UE selects the scrambling code associated with the CB-RNTI, generates UL data using the CB-RNTI and/or the scrambling code in step S1020, and transmits the generated UL data to the eNB in step S1030.

Figure 11:
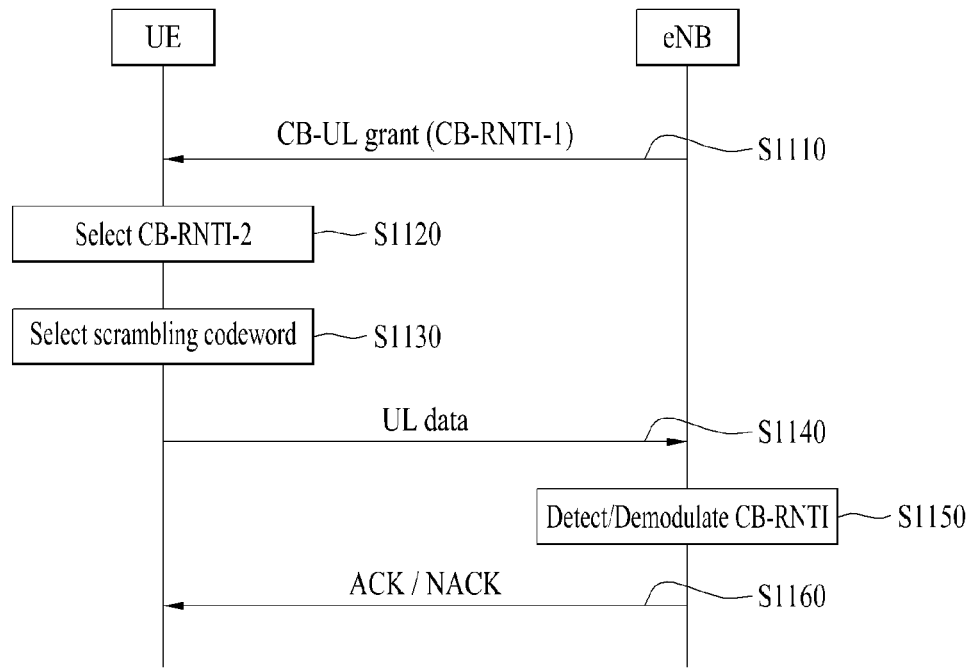
FIG. 11 is a flowchart illustrating another method for transmitting uplink data using a scrambling code related to an identifier according to an embodiment of the present invention.

FIG. 11 is a flowchart illustrating another method for transmitting uplink data using a scrambling code related to an identifier according to an embodiment of the present invention.

Referring to FIG. 11, the eNB can transmit the CB-UL grant scrambled with a first CB-RNTI (CB-RNTI-1) to the UE. The UE can recognize information of the contention-based UL channel (e.g., CB-PUSCH or CB-PUCCH) by receiving and demodulating the first CB-RNTI in step S1110.

The UE can select a second CB-RNTI (CB-RNTI-2) from among the RNTI set according to a predetermined rule in step S1120.

In step S1120, the first CB-RNTI for transceiving the CB-UL grant may be identical to the second CB-RNTI for transceiving the contention-based UL data. For example, the first CB-RNTI for transceiving the CB-UL grant may be used as one of the second CB-RNTI sets for transceiving the contention-based UL channel signal.

In step S1120, the second CB-RNTI capable of being used by the UE can be selected according to the following rule. For example, the second CB-RNTI set may be comprised of N second CB-RNTI sets increased by '+a' (where 'a' is a natural number greater than '1') from the first CB-RNTI used in the CB-UL grant.

In this case, a variable "a" or "n" may be a predetermined value between the UE and the eNB, or may be signaled by the eNB according to a specific event. That is, information of the second CB-RNTI set may be contained in the CB-UL grant and be transmitted to the UE.

Since the eNB transmits 'a' and/or 'n' value(s) to the UE, the eNB can adjust the probability of collision between UL data. For example, if the contention-based channel is allocated to a small number of UEs, the eNB may establish the 'a' and/or 'n' value(s) to low value(s). In addition, if the same contention-based channel is allocated to a large number of UEs, the eNB establishes the 'a' and/or 'n' value(s) to high value(s), so that it can transmit the established high value(s) to the UE.

Through the above-mentioned signaling, the eNB can adjust the probability of collision at which a plurality of UEs can select the same scrambling code. In addition, the eNB allocates a smaller number of RNTI sets to the UE. As a result, when the eNB detects UL data, calculation complexity of the RNTI set and the amount of power needed for the RNTI set can be reduced.

Referring back to FIG. 11, the UE can select the scrambling code associated with the second CB-RNTI in step S1130.

The UE can generate UL data using the selected second CB-RNTi and the scrambling code. That is, the UE can generate the scrambled UL data using the second CB-RNTI. The UE can transmit the generated UL data to the eNB through a CB-PUSCH or CB-PUCCH in step S1140.

The eNB can detect and demodulate each UL data transmitted from a plurality of UEs using the available second CB RNTI sets. In step S1150, the eNB can obtain the available second CB RNTI set using the first CB-RNTI used in step S1110.

The eNB can separately transmit each ACK/NACK response message for the detected second CB-RNTIs using the second CB-RNTI or associated RNTI in step S1160.

Provided that multiple UEs transmit a necessary signal using different second CB-RNTIs, each UE receives and demodulates only the ACK/NACK signal corresponding to either the second CB-RNTI (having been transmitted from the UE) or its associated RNTI, so that the UE can recognize a response to UL data transmission.

A process for transceiving the CB-UL grant shown in FIG. 11 can be replaced with a process for transceiving information of the shared D-RS. In addition, the shared D-SR signal and the CB-PUSCH signal can be simultaneously transmitted, and a detailed description thereof will be given below.

As a modification of FIG. 11, if the UE simultaneously transmits a shared D-SR signal and a CB-PUSCH signal (or if the UE sequentially transmits the shared D-SR signal and the CB-PUSCH signal without waiting for a specific response from the eNB), the UE modifies the RS-associated scrambling code into the scrambling code associated with the shared D-SR, and uses the modified result. That is, when the UE transmits a specific shared D-SR to the eNB, the UE can select the scrambling code associated with the shared D-SR according to a predetermined rule.

In accordance with the embodiments of the present invention, the UE includes UE-specific information (for example, C-RNTI, station ID, etc.) in the contention-based UL channel signal in such a manner that the eNB can quickly and correctly determine which UE is associated with the UL channel signal, and then transmit the resultant contention-based UL channel signal to the eNB.

5. Contention-Based UL Transmission Method Using Interleaving

In order to allow the eNB to effectively identify and demodulate signals transmitted from a plurality of UEs, the UE can transmit a UL channel signal using different interleaving methods or orders in the contention-based UL channel. Generally, the receiver must use the same interleaving method or order (i.e., a reverse order) as that of the transmitter so as to recover the received signal. Assuming that the receiver uses another interleaving method or order different from that of the transmitter, the corresponding signal is merely noise. In other words, multiple UEs use different interleaving methods or orders, so that the eNB can process signals of other UEs as noise when recovering a UL signal of a specific UE.

Figure 12:
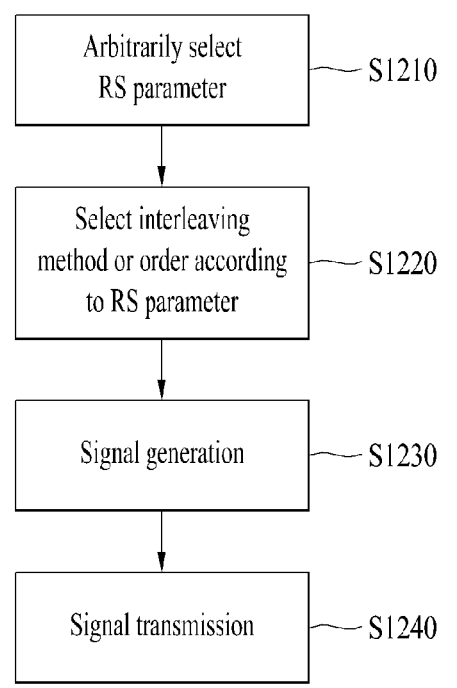
FIG. 12 is a flowchart illustrating a method for transmitting uplink data using an interleaving method or order according to an embodiment of the present invention.

FIG. 12 is a flowchart illustrating a method for transmitting uplink data using an interleaving method or order according to an embodiment of the present invention.

Referring to FIG. 12, the UE can select an RS parameter from among the RS set so as to transmit the contention-based channel signal. In this case, the UE selects an arbitrary RS parameter or selects the RS parameter on the basis of its own C-RNTI in step S1210.

The UE can select the interleaving method or order of UL data according to the RS parameter in step S1220.

The UE generates UL data using the selected interleaving method or order in step S1230, and transmits the generated UL data to the eNB in step S1240.

Figure 13:
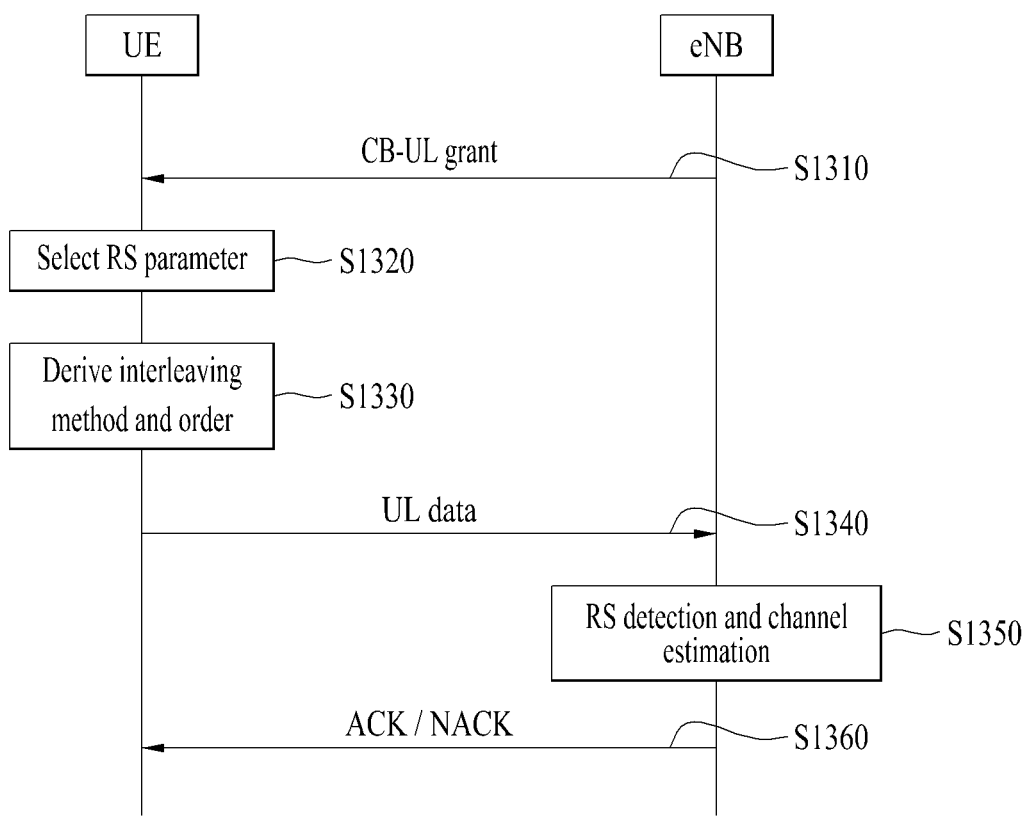
FIG. 13 is a flowchart illustrating another method for transmitting uplink data using an interleaving method or order according to an embodiment of the present invention.

FIG. 13 is a flowchart illustrating another method for transmitting uplink data using an interleaving method or order according to an embodiment of the present invention.

Referring to FIG. 13, the eNB can transmit the CB-UL grant so as to allocate the contention-based resource to the UE. In this case, the UE receives and decodes the CB-UL grant, so that it can obtain information of the contention-based uplink channel (e.g. CB-PUCCH, CB-PDSCH, etc.) in step S1310.

The UE can select the RS parameter to be used from among the set of RS parameters according to a predetermined rule. The RS parameter may be a CP amount and/or CP index to be applied to a specific code index. Alternatively, the RS parameter may be a code index or a CP amount and/or CP index to be applied to the code index. For example, a UE equipped with one Tx antenna is configured to use the same physical root index using a CP of the RS code having a length of 12 in one resource block (RB), and at the same time a maximum of 12 codes can be utilized in step S1320.

The UE can obtain the interleaving method or order from among the selected RS parameters according to a predetermined rule in step S1330.

The UE generates UL data using the selected RS parameter and the interleaving method or order, and transmits the generated UL data to the eNB. That is, the UE can transmit UL data to the eNB through the CB-PUSCH channel obtained through the CB-UL grant in step S1340.

The eNB can perform RS detection and channel estimation for the sets of available RS parameters. For example, if an RS corresponding to a specific RS parameter is detected, the eNB can recognize the RS-associated interleaving method or order. That is, the eNB can demodulate UL data using the RS parameter and the interleaving method or order in step S1350.

The eNB can transmit a response (e.g., ACK/NACK) to the detected interleaving method or order to the UE using parameters associated with each interleaving method or order, the scrambling code associated with the parameters, or the RNTI associated with the scrambling code. Preferably, the interleaving method or order used when the UE transmits UL data and the interleaving method or order used by the eNB may be selected according to a predetermined rule in step S1360.

If several UEs transmit UL data using different interleaving methods, an interleaving method or order transmitted from each UE, or only the ACK/NACK (i.e., a response message) corresponding to either associated scrambling codes (or order) or associated RNTI are received and demodulated by each UE, so that the UE can receive a response to the UL data.

In FIG. 13, a transmission/reception process of the CB-UL grant in step S1310 may be replaced with a transmission/reception process of shared D-SR information. In addition, although CB-PUSCH has been disclosed in FIG. 13 as an example, the scope or spirit of the CB-PUSCH is not limited thereto, and the RS parameter and the interleaving method or order can also be applied to CB-PUCCH without difficulty.

As a modification of FIG. 13, if the UE simultaneously transmits the shared D-SR signal and the CB-PUSCH signal (or if the UE sequentially transmits the shared D-SR signal and the CB-PUSCH signal without waiting for a specific response from the eNB), the UE modifies the RS-associated interleaving method or order into the interleaving method or order associated with the shared D-SR, and uses the modified result. That is, when the UE transmits a specific shared D-SR to the eNB, the UE can select the interleaving method or order associated with the shared D-SR according to a predetermined rule.

In accordance with the embodiments of the present invention, the UE includes UE-specific information (for example, C-RNTI, station ID, etc.) in the contention-based UL channel signal in such a manner that the eNB can quickly and correctly determine which one of UEs is associated with the UL channel signal, and then transmits the resultant contention-based UL channel signal to the eNB.

Figure 14:
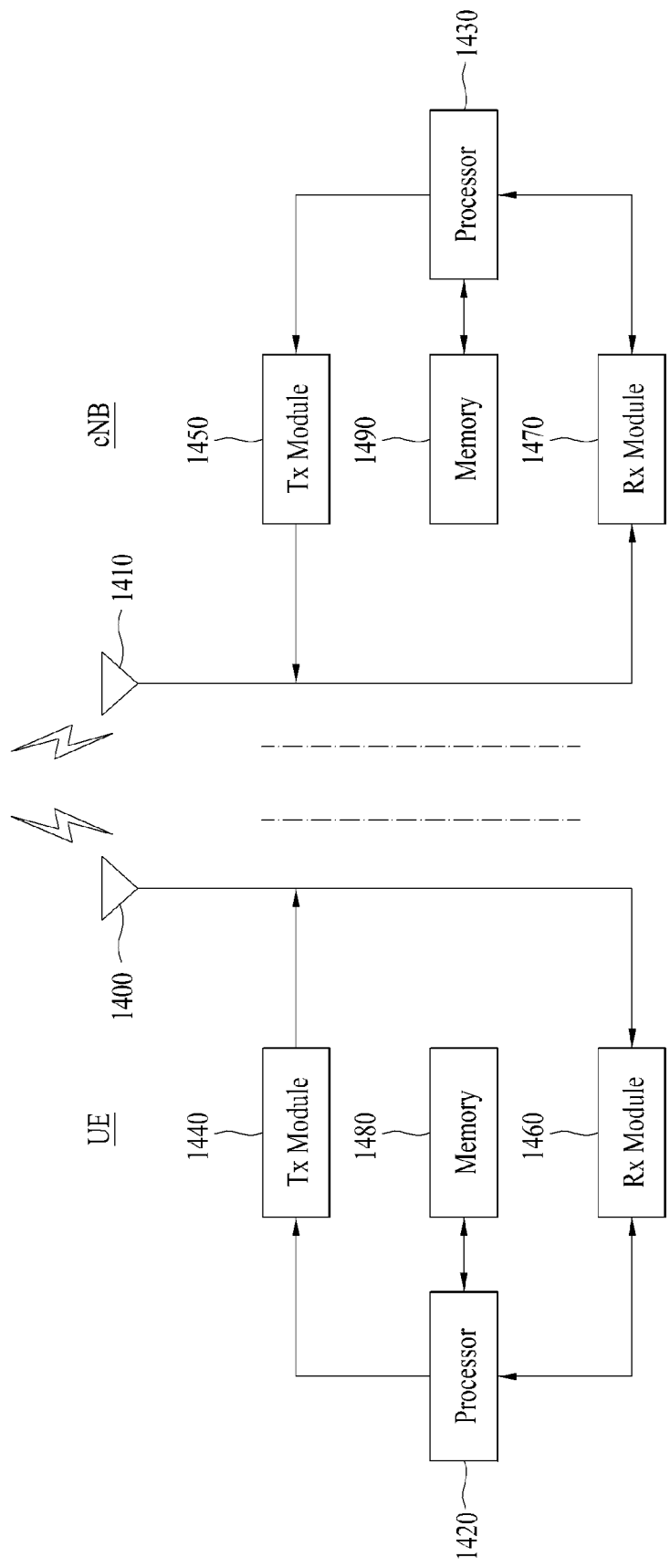
FIG. 14 is a block diagram illustrating an apparatus capable of supporting a method for transmitting/receiving a contention-based uplink channel signal according to an embodiment of the present invention.

FIG. 14 is a block diagram illustrating an apparatus capable of supporting a method for transmitting/receiving a contention-based uplink channel signal according to an embodiment of the present invention.

Referring to FIG. 14, the UE may operate as a transmitter on an uplink and as a receiver on a downlink, while the eNode B (eNB) may operate as a receiver on the uplink and as a transmitter on the downlink.

That is, the UE and the eNB may include transmission modules (Tx modules) 1440 and 1450 and reception modules (Rx modules) 1450 and 1470 to control transmission and reception of information, data, and/or messages, respectively, and may also include antennas 1400 and 1410 to transmit and receive information, data, and/or messages, respectively. The UE and the UE may further include processors 1420 and 1430 to perform the embodiments of the present invention described above and memories 1480 and 1490 which can temporarily or persistently store processes performed by the processors, respectively.

Specifically, the processors 1420 and 1430 of the UE and the eNB can support methods for transmitting/receiving the contention-based UL channel signal described in the embodiments of the present invention. For example, the UE processor can select a specific RS parameter so as to select a scrambling code, a UE ID (e.g., C-RNTI), or an interleaving method, and can select the scrambling code, the UE ID or the interleaving method or order according to the RS parameter. In addition, the UE processor controls the Tx module, generates a UL channel signal according to the selected scrambling code or the interleaving method or order, and transmits the generated UL channel signal to the eNB.

The eNB processor can detect the RS parameter and perform channel estimation from the UL channel signal transmitted from the UE on the basis of the scrambling code or the interleaving method or order. Alternatively, the eNB processor detects the UE C-RNTI scrambled with the UL channel signal so as to demodulate the UL channel signal The Tx modules and Rx modules included in the UE and the eNB may perform a packet modulation/demodulation function for data transmission, a high-speed packet channel coding function, Orthogonal Frequency Division Multiple Access (OFDMA) packet scheduling, Time Division Duplex (TDD) packet scheduling, and/or a channel multiplexing function. The UE and eNB of FIG. 14 may further include a low-power Radio Frequency (RF)/Intermediate Frequency (IF) module.

The apparatus described in FIG. 14 is a means for implementing methods for transceiving various contention-based UL channel signals described in the embodiments of the present invention. The embodiments of the present invention may be performed using constituent elements and functions of the aforementioned UE and eNB.

Meanwhile, the UE in the present invention may be any of a Personal Digital Assistant (PDA), a cellular phone, a Personal Communication Service (PCS) phone, a Global system for Mobile (GSM) phone, a Wideband CDMA (WCDMA) phone, a Mobile Broadband System (MBS) phone, a handheld PC, a notebook PC, a smart phone, a Multi Mode-Multi Band (MM-MB) terminal, etc.

The term "smartphone" refers to a terminal having the advantages of both a mobile communication terminal and a PDA and may refer to a terminal in which data communication functions such as scheduling management, fax transmission and reception, and Internet access, which are functions of the PDA, are incorporated into the mobile communication terminal. The term "MM-MB terminal" refers to a terminal which has a multi-modem chip therein and which can operate in any of a mobile Internet system and other mobile communication systems (e.g., a CDMA2000 system, a WCDMA, etc.).

The embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiment of the present invention may be achieved by a module, a procedure, a function, etc. performing the above-described functions or operations. For example, software code may be stored in the memory units 1480 and 1490 and executed by the processors 1420 and 1430. The memory units are located at the interior or exterior of the processor and may transmit data to and receive data from the processor via various known means.

The embodiments of the present invention may be carried out in other specific ways without departing from the spirit and essential characteristics of the present invention. The above detailed description is therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention can be applied to various wireless access systems, for example, a 3GPP LTE system, a 3GPP LTE-A system, a 3GPP2 system, and/or an IEEE 802.16xx system. The embodiments of the present invention may be applied to all technical fields applying the various wireless access systems, as well as the various wireless access systems.

The invention claimed is:

1. A method for transmitting first uplink data over a contention-based uplink channel, the method performed by a first user equipment (UE) and comprising:
receiving, from an eNode B, an uplink grant message including allocation information of the contention-based uplink channel; and
transmitting the first uplink data to the eNode B over the contention-based uplink channel,
wherein the first uplink data is distinguished from second uplink data transmitted over the contention-based uplink channel by a second UE,
wherein the first uplink data is generated by a first scrambling code which is different from a second scrambling code of the second uplink data,
wherein the first scrambling code is selected according to a cyclic shift amount of a first RS (reference signal) of the first UE and the second scrambling code is selected according to a cyclic shift amount of a second RS of the second UE, and
wherein the first uplink data is interleaved based on the cyclic shift amount of the first RS of the first UE.

2. The method according to claim 1, wherein the contention-based uplink channel is allocated to at least one UE.

3. The method according to claim 2, wherein the first UE does not transmit a scheduling request (SR) for requesting resource allocation used to transmit the first uplink data to the eNode B, and transmits the first uplink data to the eNode B over the contention-based uplink channel.

4. The method according to claim 1, further comprising:
selecting a second identifier for identifying the first UE on the basis of a first identifier contained in the uplink grant message;
selecting the first scrambling code depending upon the second identifier; and
generating the first uplink data based on the scrambling code and RS parameter of the first UE.

5. The method according to claim 1, further comprising:
selecting an interleaving method on the basis of a first RS parameter of the first UE; and
generating the first uplink data using the interleaving method.

6. A user equipment (UE) for transmitting first uplink data over a contention-based uplink channel, the user equipment (UE) comprising:
a transmission module and a reception module; and
a processor which is configured to:
receive, from a eNode B, an uplink grant message including allocation information of the contention-based uplink channel; and
transmit the first uplink data to the eNode B over the contention-based uplink channel,
wherein the first uplink data is distinguished from second uplink data transmitted over the contention-based uplink channel by a second UE,
wherein the first uplink data is generated by a first scrambling code which is different from a second scrambling code of the second uplink data,
wherein the first scrambling code is selected according to a cyclic shift amount of a first RS (reference signal) of the first UE and the second scrambling code is selected according to a cyclic shift amount of a second RS of the second UE, and
wherein the first uplink data is interleaved based on the cyclic shift amount of the first RS of the first UE.

7. The method according to claim 1, wherein the first scrambling code is selected according to the cyclic shift amount of the first RS and a first reference signal code index of the first UE.

8. The method according to claim 1, the first RS includes a sounding reference signal (SRS).

\* \* \* \* \*